United States Patent

Sokoluk et al.

Patent Number: 5,945,252
Date of Patent: Aug. 31, 1999

[54] PHOTOCHEMICAL GENERATION OF STABLE FLUORESCENT AMINES FROM PERI-PHENOXIDERIVATIVES OF POLYCYCLIC P-QUINONES

[75] Inventors: Natalia T Sokoluk; Vladimir V. Shubin, both of Moscow, Russian Federation; Eugene B. Levich, Ramat Aviv; Jacob N. Malkin, Ashdod, both of Israel

[73] Assignee: Memory Devices, Inc., New York, N.Y.

[21] Appl. No.: 08/989,172

[22] Filed: Dec. 11, 1997

Related U.S. Application Data

[60] Provisional application No. 60/033,709, Dec. 20, 1996.

[51] Int. Cl.$^6$ .................... G11B 7/24; G03C 1/73
[52] U.S. Cl. ............... 430/270.15; 430/19; 430/21; 430/945; 430/269; 365/106; 365/151
[58] Field of Search ................. 365/106, 121, 365/127, 151; 430/270.15, 269, 19, 21, 945

[56] References Cited

U.S. PATENT DOCUMENTS

| | | | |
|---|---|---|---|
| 4,026,869 | 5/1977 | Evens et al. | 260/47 CZ |
| 4,036,805 | 7/1977 | Tsujimoto et al. | 8/40 |
| 4,263,395 | 4/1981 | Delzanne et al. | 430/945 |
| 4,466,080 | 8/1984 | Swainson et al. | 365/127 |
| 4,864,536 | 9/1989 | Lindmayer | 365/119 |
| 5,113,387 | 5/1992 | Goldsmith et al. | 369/121 |
| 5,177,227 | 1/1993 | Fischer et al. | 552/201 |
| 5,208,354 | 5/1993 | Fischer et al. | 552/200 |
| 5,268,862 | 12/1993 | Rentzepis | 365/151 |
| 5,312,713 | 5/1994 | Yokoyama et al. | 430/945 |
| 5,325,324 | 6/1994 | Rentzepis et al. | 365/127 |
| 5,382,485 | 1/1995 | Mizuguchi et al. | 430/270.15 |
| 5,407,885 | 4/1995 | Fischer et al. | 552/200 |

FOREIGN PATENT DOCUMENTS

| | | | |
|---|---|---|---|
| 2-275943 | 11/1990 | Japan | 430/270.15 |
| 2-302754 | 12/1990 | Japan | 430/270.15 |

OTHER PUBLICATIONS

Parthenopoulos, Dimitri A. et al., "Three–Dimensional . . . Memory," Sci., vol. 245, 843–845 (1989).
Malkin, J. et al., "Photochromism . . . Naphthacenequinones," J. Am. Chem. Soc., 1994, 116, 1101–1105 (1994).
Sokolyuk, N.T. et al., "Naphthacenequinones: Synthesis and Properties," Russian Chem. Review 61(11), 1005–1024 (1993).
Gritsan, N.P. et al., "Kinetic Study of . . . 1–alkyl–9, 10–anthra–quinones," Russian J. of Phys. Chem. 64(11), 1660–1663 (1990).
Gritsan, N.P. et al., "Mechanism of Photochromic . . . Derivatives," J. Photochemistry and Photobiology, A: Chemistry, 52 (1990) 137–156.
Gritsan, Nina P. et al., "Experimental and Theoretricial . . . 1–Methylanthraquinone," J. Am. Chem. Soc. 1991, 113, 9615–9620.
Irie, Masahiro et al., "Thermally Irreversible . . . Derivatives," J. Org. Chem., vol. 53, No. 4, 1988, 803–808.
Nakamura, Shinichiro et al., "Thermally Irreversible . . . Study," J. Org. Chem. 1988, 53, 6136–6138.
Irie, M., "Design and Synthesis of Photochromic Memory Media," 1994.

*Primary Examiner*—Martin Angebranndt
*Attorney, Agent, or Firm*—Blank Rome Comisky & McCauley LLP

[57] ABSTRACT

The present invention relates to the field of optical recording materials, in particular, fluorescent compounds and matrices suitable for use in optical memory systems, including three dimensional optical memory systems for READ ONLY MEMORY (ROM). More particularly, nonfluorescent peri-phenoxiderivatives of polycyclic quinones are transformed into fluorescent aminoderivatives of anaquinones.

6 Claims, 3 Drawing Sheets

PHOTOCHEMICAL GENERATION OF STABLE FLUORESCENT AMINES FROM PERI-PHENOXIDERIVATIVES OF POLYCYCLIC P-QUINONES

This a Continuation-in-Part of Provisional Application Ser. No. 60/033, 709, filed on Dec. 20, 1996, the subject matter of which is incorporated herein by reference in its entirety.

FIELD OF THE INVENTION.

The present invention relates to the field of optical recording materials, in particular, fluorescent compounds and matrices suitable for use in optical memory systems, including three dimensional optical memory systems for READ ONLY MEMORY (ROM).

BACKGROUND OF THE INVENTION

Information storage and optical recording systems are of rapidly increasing importance in the modern society in view of the exponential rise in the number and complexity of the data which must be recorded and be retrievable so as to handle the increasing everyday business workload, and to assist efficiently enough in scientific development. Many optical information storage systems, including those based on silver halide emulsions and the like, have contributed significantly to this development, generally because of the high packing density combined with good resolution of information retrieve inherent to such systems. The advantage of READ ONLY MEMORY devices, based on photo-chemical generation of fluorescent compounds lies in the fact that storage of information in such systems is rapid and accurate, and there is no fixing required. Reading is also rapid, exceptionally sensitive and accurate and is not accompanied by degradation. At the same time there is another requirement the modem optical storage systems should comply with. The reading process should be non destructive for the memory material so as to enable repeating of reading thousands of times without detectable deterioration of the medium material. The reading process can be carried out either by scanning point by point of the same layer, i.e. bit by bit of information, or by simultaneous reading from a 2-D layer carrying a medium material with the data recorded therein. In this manner a very fast access time to the stored information can be achieved. Reading of this type can be implemented by illumination of a 2-D layer by a fiber optics means. The intensity of illumination radiation should be sufficient for triggering fluorescence within the medium material accompanied by subsequent fluorescent photo-emission from all sites of the layer where the data have been stored.

Various methods and systems of recording of information based on photo-generation of fluorescent compounds obtained from non-fluorescent precursor have been proposed.

The known methods include, for example, UV irradiation of bis-diarylchloromethyl-1,3,4-oxadiazoles as described by Singh in U.S. Pat. No. 3,869,363, herein incorporated for reference. There are known also many others systems as described by Zweig in the paper "Photochemical Generation of Stable Fluorescent Compounds", Pure and Applied Chemistry, vol. 33, pages 389–410 (1973), herein incorporated for reference.

The main common feature of the prior art optical memory systems is associated with the fact that reading in those systems can be implemented only by lasers having wavelength shorter than 500 nm. It can be appreciated that this requirement prevents employing of modern lasers with longer wavelength.

Furthermore, there exists another requirement to the optical memory systems. This requirement is associated with the fact that the intermediate photo-induced fluorescent product should be thermally and photo-chemically stable otherwise it can be destroyed by the reading process itself. Unfortunately the known in the art materials employed in optical memory systems are not sufficiently stable.

OBJECTS AND SUMMARY OF THE INVENTION

It is therefore the primary object of the present invention to provide a method of recording of information within a 3-D Read Only Memory devices enabling high efficiency of writing in terms of quantum yield of the photo-transformation and in terms of quantum yield of the photo-induced form of the medium material.

The other object of the present invention is to provide for a medium material suitable for use in an optical storage memory system, which is defined by high thermal and photochemical stability.

SUMMARY OF THE INVENTION

It has been known that photo-induced form of photo-chromic peri-phenoxyderivatives of the polycyclic p-quinones has an ana-structure (see Gerasimenko, Y. E and Poteleschenko (Sokoluk), N. T, ; Zhurnal Organicheskoj Khimii, 1971, vol. 7., pp. 2413–2415 (in Russ.), ; Gerasimenko, Y. E; Poteleschenko (Sokoluk), N. T. and Romanov, V. V.; Zhurnal Organicheskoj Khimii, 1980, vol. 16., pp. 1938–1945 (in Russ.), ; Gerasimenko, Y. E and Poteleschenko (Sokoluk), N. T.; Zhurnal Organicheskoj Khimii, 1979, vol. 15., pp. 393–396 in Russian). It has been also known that by treatment of this photo-induced form with primary aliphatic or alicyclic amines the stable amino-derivatives of ana-quinones can be obtained. It has been revealed that these derivatives being dissoluted or incorporated within a polymeric carrier exhibit luminescency which can be utilized for optical writing of information and therefore these derivatives can constitute suitable medium for optical memory storage systems.

In particular it has been revealed that peri-phenoxyderivatives of the polycyclic p-quinones, e.g. 6-phenoxy-5,12-naphthacenequinone are capable to photo-transformation under UV-irradiation into ana-form, which can be transformed into respective fluorescent amine. The above cited photo-induced transformation can be presented by the following general equation, in which the initial quinone derivative is designated as A, the ana-form is designated as B and the resulting amine is designated as C.:

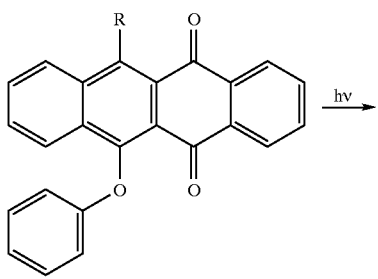

A

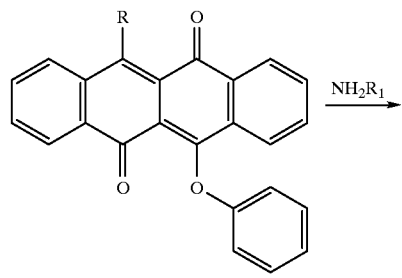

B

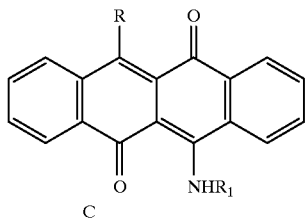

C where R=H; Cl; OCH$_3$; NO$_2$; NH$_2$; NHCOCH$_3$; NHCOC$_6$H$_5$; NHSO$_2$C$_6$H$_4$CH$_3$ and R$_1$=methyl, ethyl, propyl, cyclopentyl, cyclohexyl, octadecyl; (see Gerasimenko, Y. E and Poteleschenko (Sokoluk), N. T.; Zhurnal Organicheskoj Khimii, 1971, vol. 7., pp. 2413–2415, in Russian.).

The similar transformation has been discovered for the 11-substituted of 6-phenoxy-5,12-naphthacenequinone (see Gerasimenko, Y. E; Poteleschenko ( Sokoluk), N. T. and Romanov, V. V.; Zhurnal Organicheskoj Khimii, 1980, vol. 16., pp. 1938–1945 (in Russian) and for 5-phenoxy-6,13-pentacenequinone where R$_2$=H. (see Gerasimenko, Y. E and Poteleschenko (Sokoluk), N. T.; Zhurnal Organicheskoj Khimii, 1979, vol. 15., pp. 393–396 (in Russian).

The above cited transformation can be presented by the following equation in which the initial quinone derivative is designated as D, the ana-form is designated as E and the resulting amine is designated as F.:

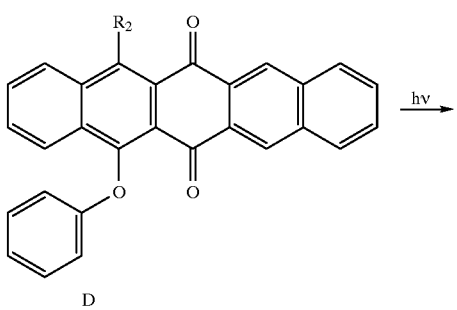

D (1)

-continued

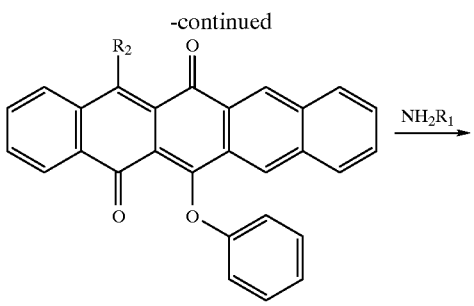

E

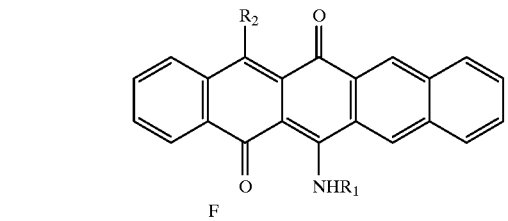

F where R$_1$=methyl, ethyl, propyl, cyclopentyl, cyclohexyl, octadecyl

R$_2$=H, OCH$_3$, CH$_3$

The photo-induced ana-quinones B and E show a very high reactivity in S$_N$2 reactions, especially in reactions of substitution of phenoxy group with ammonium or primary amines. The formation of the final products—amines C and F is observed already at room temperature. The reaction undergoes in liquid solvents and in solid polymer media: polystyrene, polymethylmethacrylate, copolymer of butyl-methacrylate with methacrylamide and so on.

In accordance with present invention the above transformation reactions can be successfully implemented for recording of information in various optical memory systems by virtue of the fact that the above amines exhibit induced fluorescence when illuminated by a long wave radiation. The induced fluorescence can be detected for example by a CCD camera.

DETAILED DESCRIPTION OF THE PREFERRED EMBODIMENTS

The process of writing of information based on using derivatives of polycyclic p-quinones A, D is described in the following non-limiting example 1.

Example 1

0.0046 g 6-p-amylphenoxy)-5,12-naphthocenequinone is soluted in 5 cm3 of the solution of polystyrene in toluene (7.63 weight % of polystyrene). 0.0592 g of octadecylamine is being soluted in 10 cm$^3$ of the solution of polystyrene in toluene at 40° C. for 30 minutes. Both solutions have been cooled up till 10–15° C. and have been mixed up. The ready composition have been deposited on lavsan slide with the aim of applicator and was allowed to evaporate until the complete drying out. The ready film having thickness 5 μ was irradiated for 3 minutes with high pressure Hg-lamp (200 W) via UV filter and the very contrast red photocoloration has been got. The written information is thermally exceptionally stable: the photoinduced optical density of the film described in Example 1 (D=0.38) haven't indicated any change for 1 year.

Figure 1:
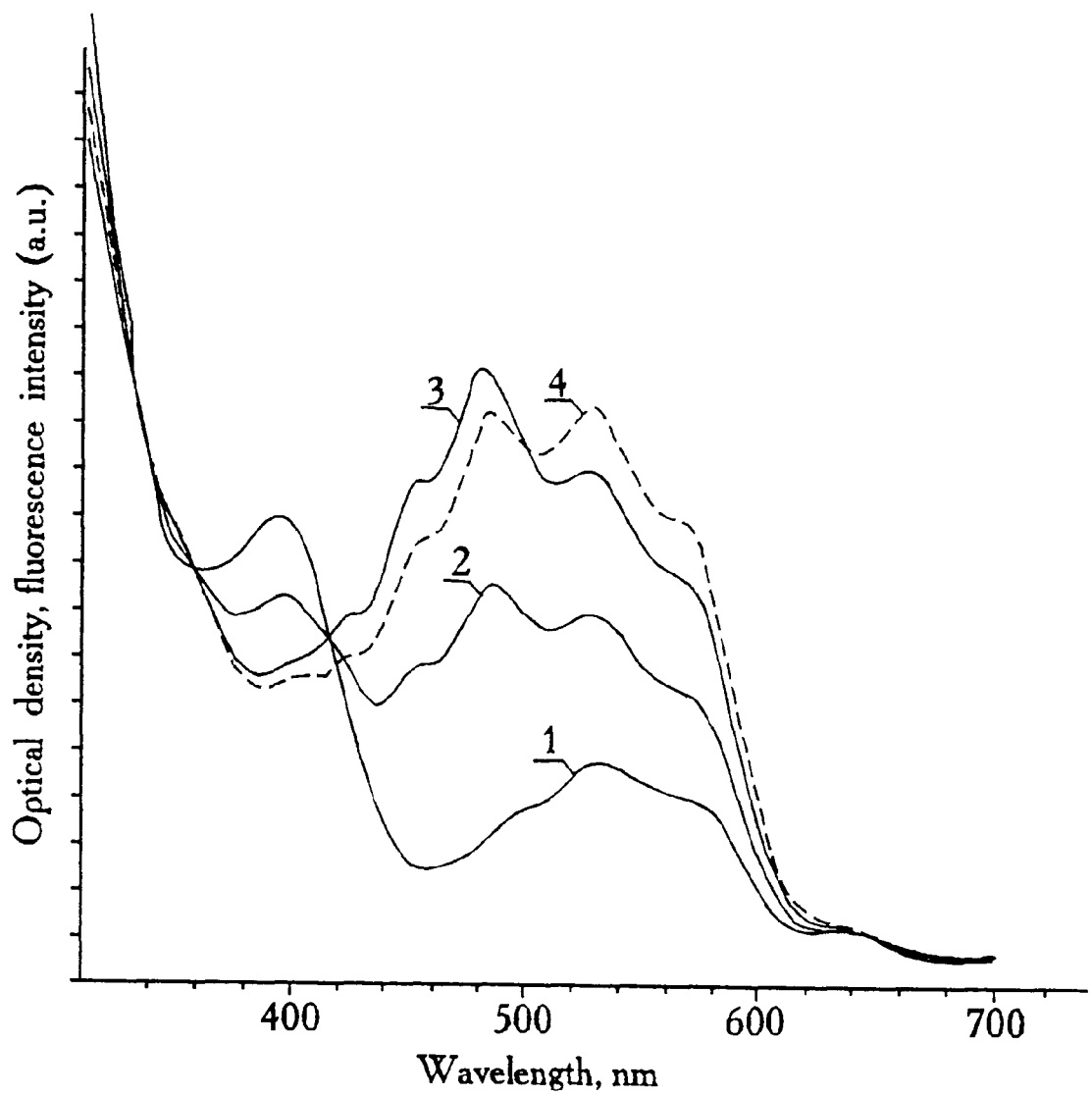
FIG. 1 shows the UV visible spectra of polystyrene film carrying $1.09 \times 10^{-5}$ M of 6-(p-amylphenoxy) naphthacenequinone with $2.2 \times 10^{-5}$ M octadecylamine.

In FIG. 1 one can see the UV visible spectra of initial quinone derivative D and fluorescent amines produced therefrom when soluted in a solvent before irradiation (initial form D, curve 1), after 20 sec irradiation by 200 W Hg lamp (amine form E, curve 2), after 60 sec irradiation (amine form E, curve 3) and after holding in darkness for 25 minutes (amine form E, curve 4).

Figure 2:
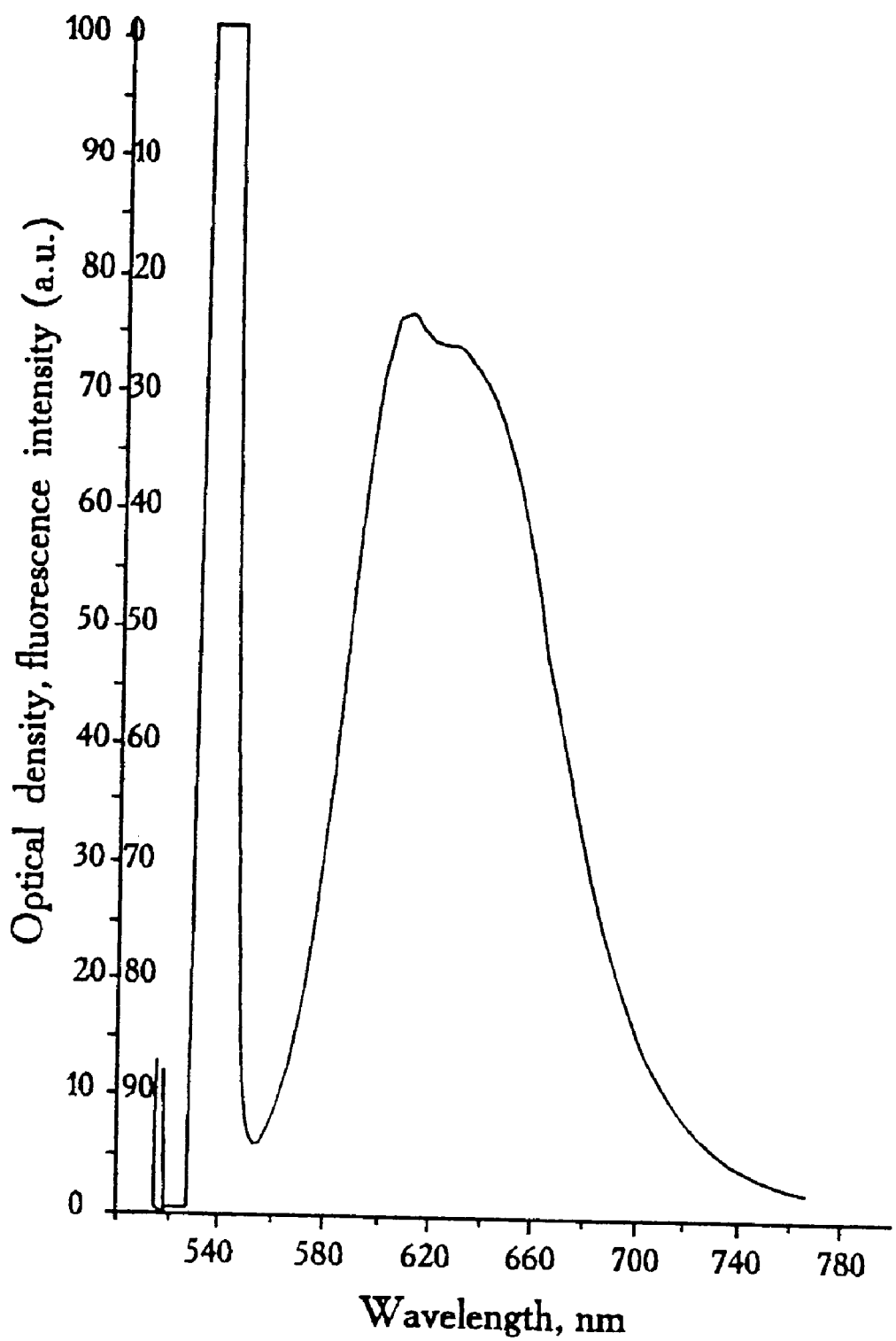
FIG. 2 shows fluorescence spectra of polystyrene film carrying $1.09 \times 10^{-5}$ M of 6-(p-amylphenoxy) naphthacenequinone with $2.19 \times 10^{-5}$ M octadecylamine.
Figure 3:
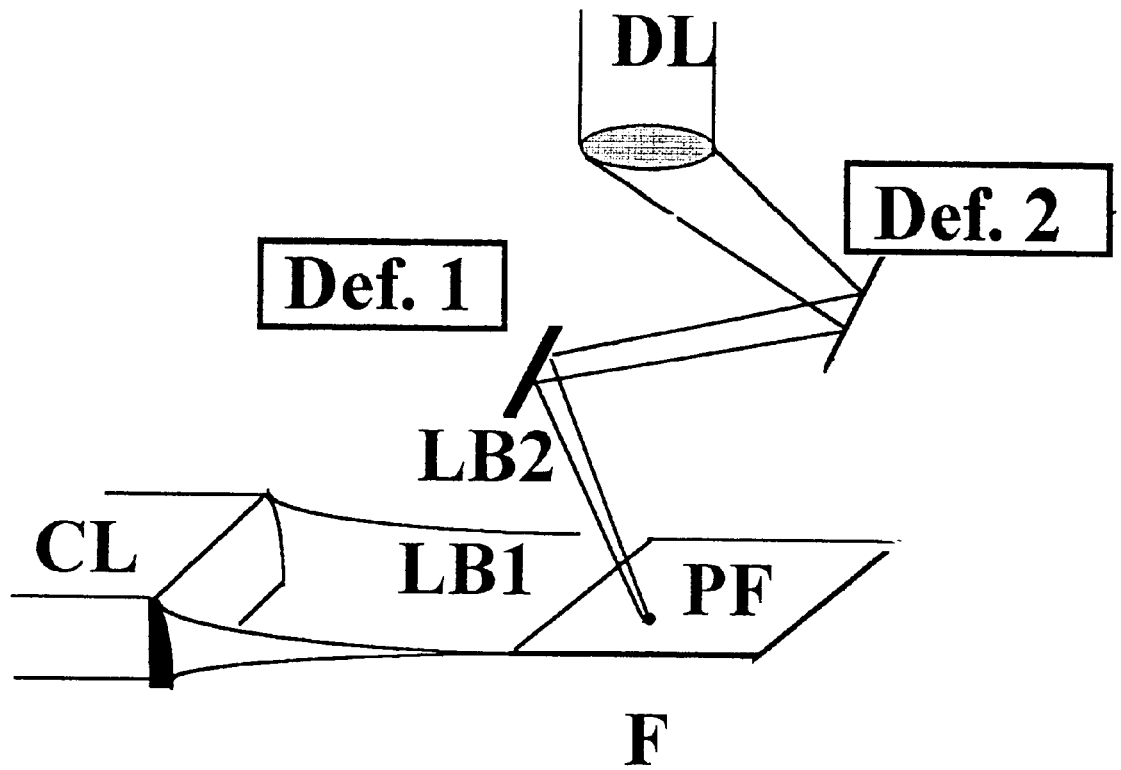
FIG. 3 shows experimental set-up suitable for the two-photon writing of information into 3-D memory system.

FIG. 2 shows the fluorescence spectra of the amine form E when distributed in solid polymer after it has been irradiated by 200 W Hg lamp for 60 sec and kept in darkness for 25 min, excitation 520 nm.

Now with reference to non-limiting tables 1,2 below it will be shown spectral and luminescent properties of various amine forms produced from different initial quinone derivatives.

TABLE 1

Spectral and Luminescent Properties of the mixture of (p-amylphenoxy)-5,12-naphthocenequinone with different amines at 25° C. when distributed in polystyrene film

| Amine form | $\lambda_{max}^A$ | $\lambda_{max}^C$ | $\lambda_{Fl}^C$ | $\phi_{AC}$ | $\phi_{Fl}^C$ |
|---|---|---|---|---|---|
| Octadecylamine | 391 | 473, 532, 571 | 618 | 0.14 | 0.09 |
| Heptylamine | 392 | 455, 518, 560 | 603 | 0.10 | 0.04 |
| Hexylamine | 389 | 450, 530, 569 | 608 | 0.09 | 0.02 |

TABLE 2

Spectral and Luminescent Properties of the mixture of -(p-hexylphenoxy)-5,12-naphthocenequinone with different amines at 25° C. distributed in polystyrene film

| Amine form | $\lambda_{max}^A$ | $\lambda_{max}^C$ | $\lambda_{Fl}^C$ | $\phi_{AC}$ | $\phi_{Fl}^C$ |
|---|---|---|---|---|---|
| Octadecylamine | 383 | 450 529, 561 | 609 | 0.06 | 0.03 |
| Heptylamine | 401 | 457, 508, 565 | 602 | 0.11 | 0.03 |
| Hexylamine | 382 | 458, 536, 581 | 611 | 0.04 | 0.01 |

In the above tables:

$\lambda_{max}^A$ and $\lambda_{max}^C$ are absorption maxima of initial forms A and amine forms C, $\lambda_{Fl}^C$ is fluorescence maximum of amine forms C;

$\phi_{AC}$ quantum yield of the phototransformation of form A into form C for the wavelength of the irradiation 466 nm and $\phi_{Fl}^C$ is quantum yields of fluorescence of form C at excitation with 520 nm.

So the writing of information is implemented by causing an naphthacenequinone to absorb the irradiated light whereby being transformed to an amine form C or F. The reading of the recorded information is performed by detecting the fluorescence emitted from the amine C or F. From the above data one clearly see that the reading of information can be implemented by excitation at about 600 nm, thus the modern miniature diode lasers can be applied for reading.

The active medium in accordance with the present invention can be advantageously implemented in the process of 2 photon writing by virtue of a set-up as shown in FIG. 2. Two laser beams LB1 and LB2 from two respective laser sources (not shown) are selectively directed onto the layer of polymeric film F constituting a matrix carrying an active medium incorporated therein. The composition of this medium is chosen in accordance with the present invention. The first beam is produced by a cylindrical lens CL and the second beam is produced by a diode laser DL. The second beam can be deflected by virtue of deflectors Def1 and Def2. The film is transparent to the electromagnetic radiation at least in some parts of the spectrum. The intersection of beam LB1 with the beam LB2 in a selected point of focus PF on the film is accompanied by a photo-chemical reaction in this selected location. In practice this location looks like a colored point. The laser beams can be displaced across the film and so the point of focus, which will describe a trajectory inside the polymeric film. The intersection of the trajectory with the active sites of the matrix is accompanied by writing of the binary data. The remaining part of material, that is the ones not intersected by this trajectory, is not affected since the irradiation intensity beyond the focus is less than the threshold required for transformation of the initial quinone derivative into amine form.

In practice the writing was implemented by mode-locked Nd:Yag pico-second laser with the following parameters:

energy E(1064 nm)=0.3 μJ; E(532 nm)=0.03 μJ; P(1064 nm)=22W; P(532 nm)=2W; A(1064 nm)=3 μ×3 μ=$10^{-7}$ $cm^2$; A(532 nm)=30 μ×1cm=3 $10^{-3}$ $cm^2$;

The beam at 532 nm was focused by the cylindrical lens creating flat beam with uniform thickness app.0.30microns (con-focal parameter in this case is about 1cm). The intersection of this beam with focused beam at 1064 nm is followed by corresponding photo-transformation of a quinone derivative form into amine form.

The photons emitted by amine form can be deflected towards a CCD camera (not shown) and registered. This registration will constitute the process of reading. From a practical viewpoint the fluorescent response of the medium material presenting in the amine form, with a written information recorded in it, would occur only if the intensity of the irradiation is sufficiently high. This second energy threshold, however, is lower than the threshold that should have been exceeded for writing.

The active medium in accordance with the present invention is characterized by a very high photochemical stability: 180-hours irradiation of the film disclosed in Example 1 at the wavelength 580 nm (applied as an excitation source for reading) within the cell of the spectro-fluorimeter Shimadzu didn't lead to any visible changing in the intensity of the fluorescence of the photoinduced amine form. Similar irradiation of the film carrying bis-di-m-anilinochloromethyl-1, 3,4-oxadiazole as an active medium described in US Pat. No. 3869363 resulted in reducing the fluorescence intensity by 2.6 times.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A method for the recording of information within an optical, write once read many times memory system comprising an active medium material capable of storing information in three dimensions which includes a dye, said dye comprising at least one peri-phenoxy derivative of polycyclic p-quinones said method comprising the steps of illuminating said active medium material with electromagnetic radiation in the presence of aliphatic or alicyclic amines to induce a photochemical reaction of said peri-phenoxy derivative of polycyclic p-quinones with said aliphatic or alicyclic amines to form a second, fluorescent, amino derivative of an anaquinone, said peri-phenoxy derivative of polycyclic p-quinones having the structures represented by formulas A and D and said fluorescent, amino derivative of an anaquinone having the structures represented by formulas C and F,

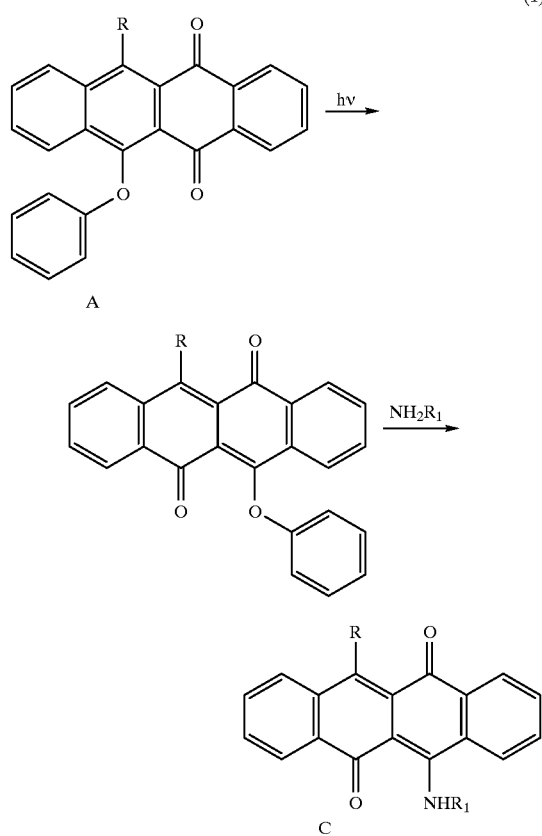

where R=H; Cl; $OCH_3$; $NO_2$; $NHCOCH_3$, $NHCOC_6H_5$; $NHSO_2C_6H_4CH_3$ and $R_1$=methyl, ethyl, propyl, cyclopentyl, cyclohexyl, octadecyl;

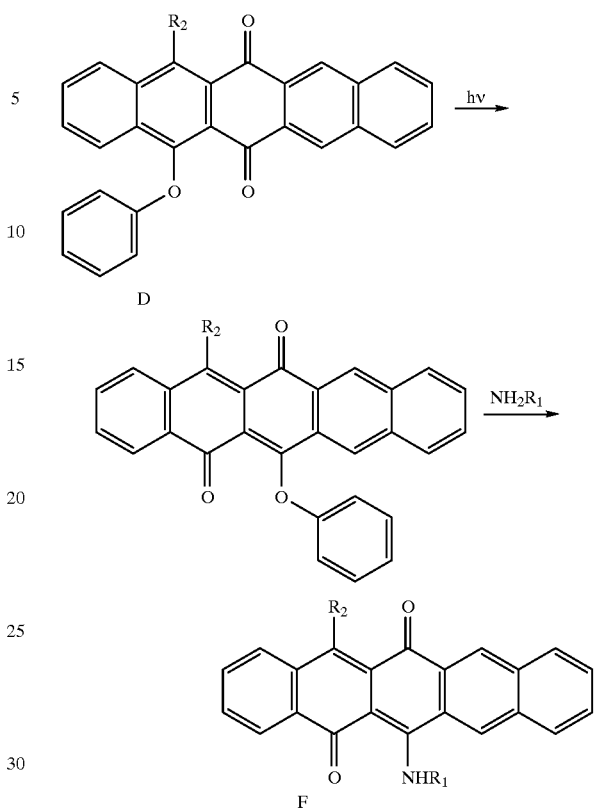

where $R_1$=methyl, ethyl, propyl, cyclopentyl, cyclohexyl, octadecyl and $R_2$=H, $OCH_3$, $CH_3$; wherein said information is recorded in said active media by said formation of a fluorescent amino derivative of anaquinone.

2. The method of claim 1, in which said reaction is photochemical transformation of p-amylphenoxy-5,12-naphtacenequinone in presence of octadecylamine into amino derivatives.

3. The method of claim 1, in which said reaction is photochemical transformation of p-hexylphenoxy-5,12-naphtacenequinone in the presence of heptylamine into aminoderivatives.

4. The method of claim 1, wherein said phenoxiderivatives of polycyclic p-quinones and said amines are distributed within a liquid solution of polystyrene in toluene or within a solid carrier formed as a polymeric film made of a compound chosen form the group consisting of polystyrene, polymethylmetacrylate and copolymers of butylmethacrylate with methacrylamide.

5. The method of claim 1, wherein said electromagnetic radiation is carried out either in one or two photon mode and is effected by a laser, Hg lamp or by any other source of UV or visible light.

6. A write once, read many times optical memory system, comprising an active medium material capable of storing information in three dimensions wherein said active medium undergoes a photochemical transformation from a first non-fluorescent form into a second fluorescent form, said transformation being induced by illumination of said material with a first electromagnetic radiation and fluorescence of said second form being induced by illumination with a second electromagnetic radiation, having a wavelength different from that of said first radiation and said transformation being associated with recording of information within said system, wherein said active medium material contains at least one peri-phenoxyderivative of polycyclic p-quinones and at least one aliphatic or alicyclic amine.

* * * * *